United States Patent

Huang et al.

[11] Patent Number: 5,611,821
[45] Date of Patent: Mar. 18, 1997

[54] BLACK REACTIVE DYE COMPOSITION

[75] Inventors: Huei C. Huang, Taoyuan Hsien; Sheue R. Lee, Chung Li, both of Taiwan

[73] Assignee: Everlight USA, Inc., Pineville, N.C.

[21] Appl. No.: 545,259

[22] Filed: Oct. 19, 1995

[51] Int. Cl.⁶ .................................................. D06P 1/384
[52] U.S. Cl. ........................ 8/549; 8/641; 8/681; 8/682; 8/683; 8/684; 8/692
[58] Field of Search ................................ 8/549, 641, 692, 8/680, 681, 682, 683, 684

[56] References Cited

U.S. PATENT DOCUMENTS 5,445,654 8/1995 Hussong et al. .......................... 8/546

FOREIGN PATENT DOCUMENTS

| | | |
|---|---|---|
| 600322 | 11/1993 | European Pat. Off. . |
| 55-131061 | 10/1980 | Japan . |
| 58-160362 | 9/1983 | Japan . |
| 63-178170 | 7/1988 | Japan . |
| 1-289868 | 11/1989 | Japan . |

*Primary Examiner*—Margaret Einsmann
*Attorney, Agent, or Firm*—Fish & Richardson P.C.

[57] ABSTRACT

A black reactive dye composition comprising a black reactive dye of the formula (I) and multiple mono

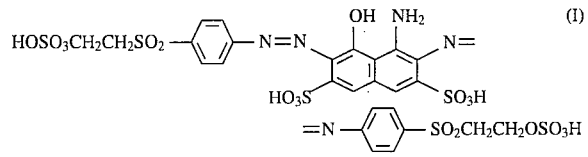

azo reactive dye. The black reactive dye composition is suitable for exhaust dyeing, printing, discharge printing and continuous dyeing.

8 Claims, No Drawings

BLACK REACTIVE DYE COMPOSITION

BACKGROUND OF THE INVENTION

The present invention relates to a black dye, in particular relates to a black reactive dye composition.

So far, there is no single reactive dye which can produce a high black shade build up property. In order to get a high black shade build up property, a reactive dye composition which contains a plurality of reactive dye components has been used. Usually, one black reactive dye as the major component, is mixed with red, orange, yellow or other shade reactive dye components to get the black reactive dye composition.

Japanese Patent Publication No. 160,362/1983 discloses a black reactive dye composition which contains formula (I) black reactive dye and formula (5)

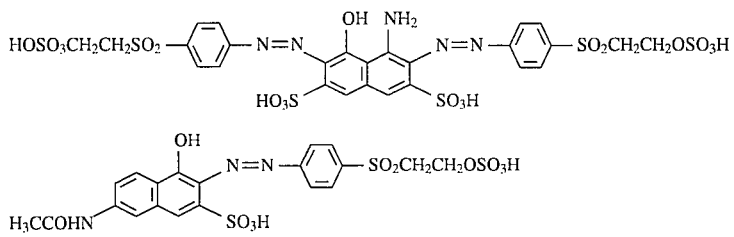

orange reactive dye. Nevertheless, when this black dye composition is used in dyeing, the dyed material can not accumulate a high build up property.

Japanese Patent Publication No. 17,8170/1988 discloses another black reactive dye composition which contains formula (I) black reactive dye as described above and formula (6) orange reactive dye. This composition has better dyeing additivity, but it has worse leveling property. In addition, the formula (6) component has less solubility. In a high concentrated dye solution, the formula (6) component will precipitate out, and this limits the usefulness of said composition in high concentrated dye solution.

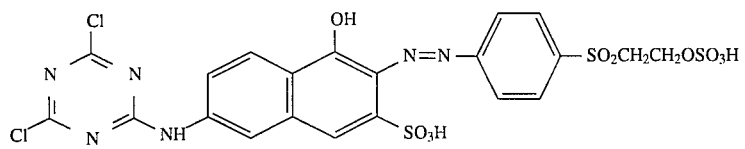

Japanese Patent Publication No. 73,870/1990 discloses a black reactive dye composition which contains formula (I) black reactive dye, formula (5) and formula (6) orange reactive dye as described above. Nevertheless, this composition still has less build up property and less solubility problems.

Japanese Patent Publication No. 202,956/1990 discloses a black reactive dye composition which contains formula (I) reactive black dye as described above and formula (7) reactive dye or formula (8)

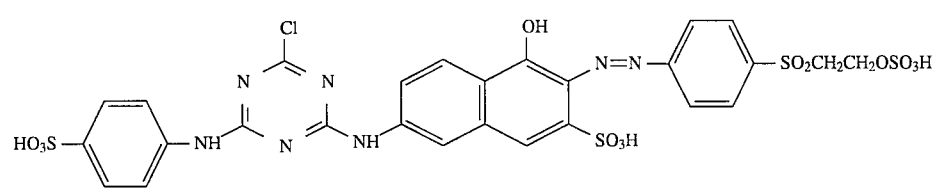

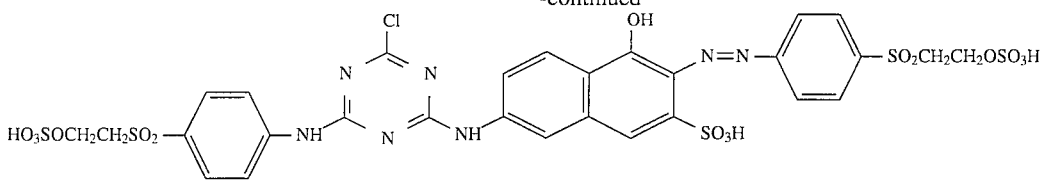

reactive dye. The components of formula (7) and (8) have better solubility, but formula (7) has less dyeing compatibility and formula (8) has lower tinctorial strength. This dye composition still does not totally solve the above problems.

Furthermore, most reactive dyes do not have good properties when used in discharge printing. Usually, they can not totally discharge and this limits the usefulness of the reactive dyes. Therefore, to provide a reactive dye with better discharge printing property is another target for the dyeing industry.

SUMMARY OF THE INVENTION

The present invention provides a black reactive dye composition which can be used for fiber exhaust dyeing, printing, continuous dyeing and discharge printing to give a better dyeing property.

One aspect of the present invention relates to a black reactive dye composition which comprises (a) a black reactive dye of the formula (I); (b) a mono azo

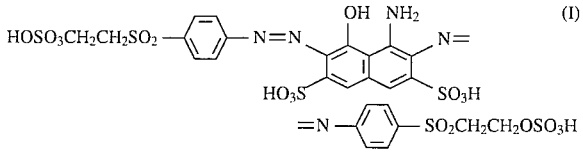

reactive dye of the formula (II), wherein X is —CH=CH$_2$ or

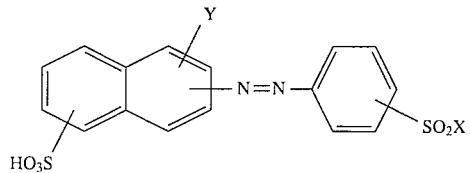

—CH$_2$CH$_2$W, W is a leaving group (e.g., halogens, acetyl, phosphate, trisufate, and sulfate) which is eliminable by a base, Y is hydrogen, hydroxyl, amino, or amino derivatives; and (c) at least one mono azo reactive dye selected from the formula (III) and (IV) wherein X is

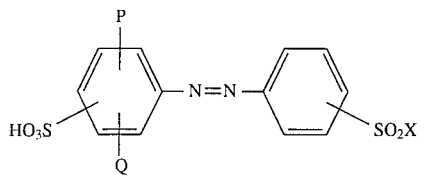

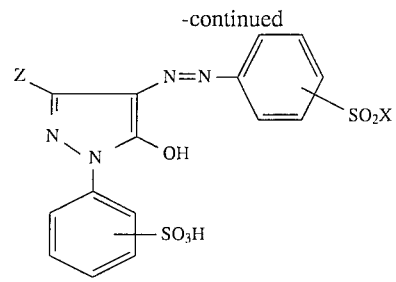

—CH=CH$_2$ or —CH$_2$CH$_2$W, W is a leaving group as defined above, P and Q each independent is hydrogen, methyl, ethyl, n-propyl, amino or amino derivatives, Z is methyl, ethyl, n-propyl or carboxyl.

The composition of the present invention can exist as free acids, but the salt forms, for example, alkali salts or alkali salts or alkaline earth salts are more suitable to carry out the process. In all these salts, sodium salt, potassium salt and lithium salt are especially suitable. The ratio of each dye component can be changed in wide a range. In general, the minimum relative weight percentage for each dye component is 3%, and the maximum relative weight percentage is 94%. The composition of the present invention preferably contains component (a) 50–94% by weight, component (b) 3–47% by weight, and component (c) 3–30% by weight.

Other features and advantages of the present invention will be apparent from the following description of the preferred embodiments, and also from the appending claims.

DESCRIPTION OF THE PREFERRED EMBODIMENTS

The preparation of formula (II) of the present invention is described in Japanese Patent 40,182/1970. It reacts a diazonium salt of formula (9) wherein X is

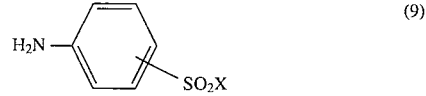

—CH=CH$_2$ or C$_2$H$_4$W, and W is a leaving group which is eliminable by a base with formula (10) wherein Y is

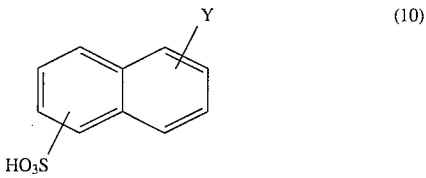

selected from hydrogen, hydroxyl, amino or amino derivatives to get formula (II). Formula (II) can be for example compound (11), compound (12), compound (13), compound (14), compound (15) or compound (16).

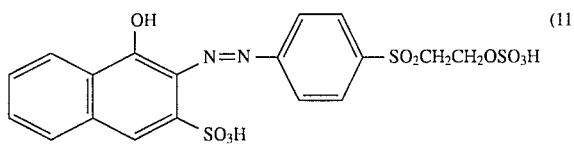
(11)

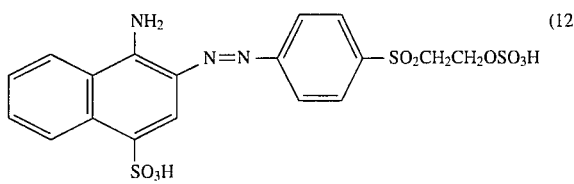
(12)

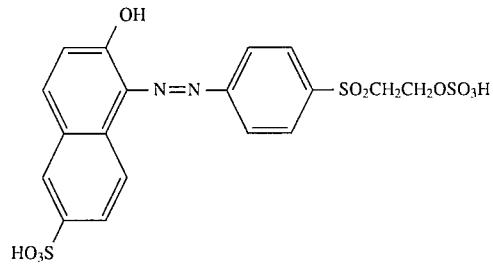
(13)

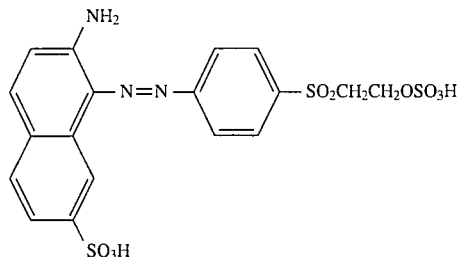
(14)

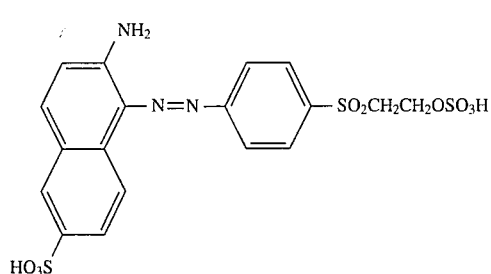
(15)

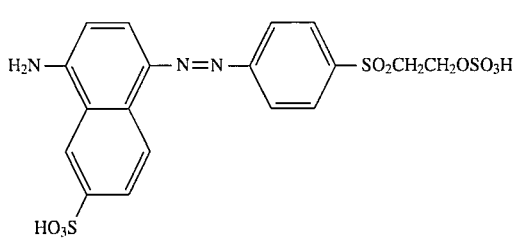
(16)

The formula (III) of the present invention can be prepared by reacting a diazonium salt of formula (9) with formula (17) wherein P and Q each independently is

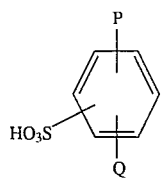
(17)

selected from hydrogen, methyl, ethyl, n-propyl, amino or amino derivatives. For example, German Patent DE4329421 discloses the preparation of compound (18), German Patent DE1911427 discloses the preparation of compound (19), German Patent DE3134357 discloses the preparation of compound (20), and European Patent EP292825 discloses the preparation of compound (21).

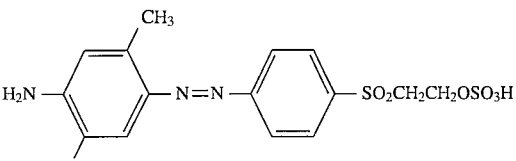
(18)

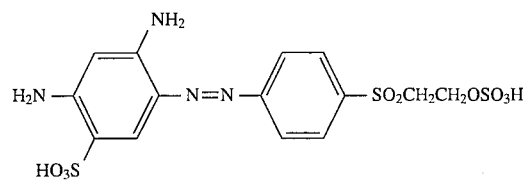
(19)

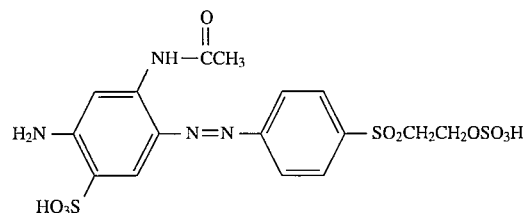
(20)

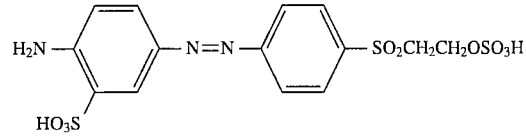
(21)

The formula (IV) of the present invention can be prepared by reacting a diazonium salt of formula (9) with formula (22) wherein Z is selected from methyl, ethyl,

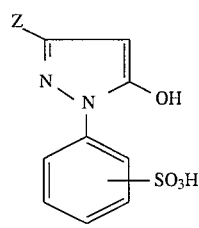
(22)

n-propyl or carboxyl. For example, German Patent DE172789 discloses the preparation of formula (23), Japanese Patent Publication No. 9666/1968 discloses the preparation of formula (24), Japanese Patent Publication No. 14107/1969 discloses the preparation of formula (25).

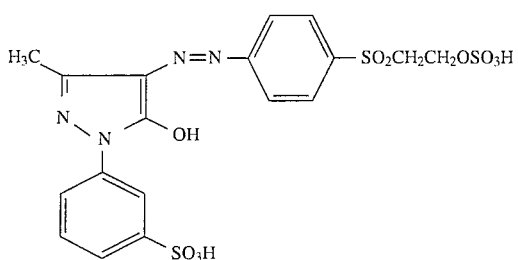

(23)

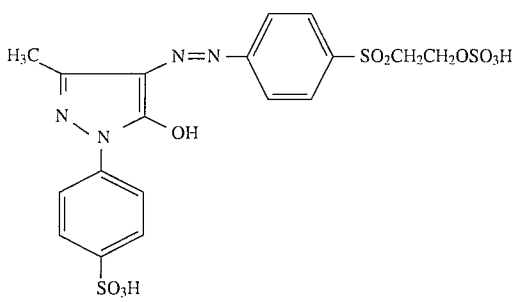

(24)

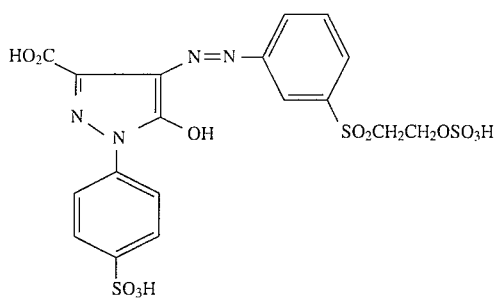

(25)

The composition of the present invention can be powder, granular, particle or liquid forms, and can add auxiliary reagents, for example, retarding agent, leveling agent, assistant agent, surfactant agent, buffer agent and dispersing agent.

The composition of the present invention can be used in traditional dyeing methods, for example, exhaust dyeing, printing, continuous dyeing and discharge printing.

Exhaust dyeing is a mono shade dyeing, its dyeing method can get a homogeneous single shade. The method of exhaust dyeing is to put fiber material into a dyeing solution, so that it can absorb dye, then adjust pH value so that the dyeing can proceed through the covalent bond formation.

Printing can use a one phase or two phase process. Single phase printing is used to printing fiber materials which contains acid acceptor, for example, sodium hydrogen carbonate printing paste. Two phase printing also called pad-steam process. It is used for printing fiber materials which contains neutral or weak acidic printing paste.

Discharge printing can also be called decolor printing. It uses printing paste with discharge agent (for example Rongalite) to print on fiber materials which have ground shade, so that the ground shade can be removed. In order to increase discharging an effect assistant can be added, such as zinc oxide.

More detailed examples are used to illustrate the present invention, and these examples are used to explain the present invention. The examples below, which are given simply by way of illustration, must not be taken to limit the scope of the invention.

In examples, parts is counted as weight, temperature is Celsius °C., the weight share to volume share is gram to cubic, all dye formula is expressed as free acid.

EXAMPLE (1)

Formula (I) dye 64 parts, compound (12) 23 parts and compound (23) 13 parts are mixed to get a homogeneous dye composition. Then using the following dyeing methods to perform dyeing to get all kinds of good fastness black dyeing materials.

1. Exhaust dyeing:

Take the above homogeneous dyeing mixture one part to completely dissolve in 100 parts distilled water to get dye liquor. Then, take two dye boxes which are washed with distilled water and put dye liquor 40 parts and 80 parts into each dye boxes and finally add 4.8 parts Glauber's salt into each dye box. Distilled water is added to each dye box to get total 85 parts, then add 320 g/l soda ash 5 parts to each dye box. Put two parts prewet full cotton woven fabric into each dye box. The top of the dye box is covered with a lid and shaken to get homogeneous dye, then put dyeing bottle into a 62° C. thermo bath and heat up to 60° C. in 5 minutes and keep at the same temperature for 60 minutes. The fabric is taken out and washed with cold water, then put into a big stainless bucket washed with hot water for 10 minutes, then put fabric into another big stainless bucket, and with 2 g/l soaping agent, and washed with boiling water for another 10 minutes. Finally, the fabric is taken out washed with cold water then dried.

2. Printing:

Put urea 100 parts, sodium meta-nitro benzene sulfonate 10 Parts, sodium bicarbonate 20 parts, sodium alginate 55 parts and warm water 815 parts into a vessel to get paste, then stir to get a completely homogeneous printing paste. Take print paste 46 parts and dye 4 parts mixed together to make a homogeneous color paste. Put 100 mesh printing screen cover on an adequate size full cotton fabric, then paint color paste on printing screen to get a color fabric. Put color fabric into 65° C. oven to dry 5 minutes, take out dried color fabric, put into steam oven using saturated steam to steam for 10 minutes at 102° C.–105° C. As with exhaust dyeing, the fabric is washed with cold water, hot water and soap wash then dried.

3. Continuous dyeing:

Take dye 3 parts, sodium alginate 0.4 part and distilled water 46.6 parts, mix together to get padding liquor. The padding liquor is used to pad a fabric with pad mangle immediately. The temperature of the padding liquor can not exceed 30° C. and the pad ratio is 70%. Take the fabric into 65° C. oven to dry for 5 minutes, then put dried fabric into steam oven using saturated steam to steam for 40 seconds at 102° C.–105° C. As with exhaust dyeing, the fabric is washed with cold water, hot water and soap wash then dried.

4. Discharge printing:

Take urea 100 parts, sodium meta-nitro benzene sulfonate 10 parts, sodium bicarbonate 20 parts, sodium alginate 55 parts and warm water 815 parts in a vessel to get paste, then stir to get a completely homogeneous printing paste. Take printing paste 46 parts and dye 4 parts mixed together to make a homogeneous color paste. Then take Rongalite 40 parts, sodium alginate 55 parts and add warm water to 1000 parts mixed to get discharge paste. Put 100 mesh printing screen cover on a adequate size full cotton fabric, then paint color paste on printing screen to get color fabric. Take color fabric into 65° C. oven to dry for 5 minutes, take out dried color fabric. Using discharge paste, repeat the above procedure to print discharge paste on fabric. Then put color fabric into 65° C. oven to dry for 5 minutes take dried color fabric into steam oven using saturated steam to steam for 10 minutes at 102° C.–105° C. As with exhaust dyeing, the fabric is washed with cold water, hot water and soap wash then dried.

EXAMPLE (2)

Take formula (I) dye 57 parts, compound (13) dye 40 parts and compound (24) dye 3 parts mixed together go get a homogeneous mixture. Then repeat the dyeing procedures in example (1) to get all kinds of good fastness black dye products.

EXAMPLE (3)

Take formula (I) dye 56 parts, compound (12) dye 22 parts and compound (24) dye 22 parts mixed together to get a homogeneous mixture. Then repeat the dyeing procedures in example (1) to get all kinds of good fastness black dye products.

EXAMPLE (4)

Take formula (I) dye 70 parts, compound (12) dye 19 parts and compound (24) dye 15 parts mixed together to get a homogeneous mixture. Then repeat the dyeing procedures in example (1) to get all kinds of good fastness black dye products.

EXAMPLE (5)

Take formula (I) dye 72 parts, compound (16) dye 12 parts and compound (19) dye 16 parts mixed together to get a homogeneous mixture. Then repeat the dyeing procedures in example (1) to get all kinds of good fastness black dye products.

Solubility test:

Take example(1) to example (5) five compositions to carry out the following 150g/l solubility tests. In 250 parts beaker add 7.5 parts dye and 50 parts distilled water. Using a glass rod, stir to get homogeneous solution. Then heat up to 50°±2° C. and keep at that temperature, stirring, for 5 minutes. Take prewetting TOYO No. 1 filter paper and funnel dry with suction then pour the above solution into funnel with suction to dry. Take out filter paper and dried in the open air. The test is judged by the dye material which is left on the filter paper. If no dye material is left on the filter paper, it means the dye material passes the solubility test. The results of the test show example (1) to example (5) five compositions all pass the solubility test and all have good solubility.

Properties test results:

Use the composition which comprising formula (I) black reactive dye and formula (6) orange reactive dye (this composition is disclosed in Japanese Patent 17810/1988) as a reference, repeating the dyeing procedures in example (1) also can get all kinds of black dye products. Table 1 lists the results of the properties test which includes example (1) to example (5) five compositions and reference composition. In table 1 the exhaust dyeing, printing and continue dyeing are compared between example (1) to example (5) and reference, and the reference is treated as 100%. The results show that the composition of the present invention is suitable for exhaust dyeing, printing, continue dyeing and discharge printing.

TABLE 1

| | Exhaustion dyeing | Printing | Continue dyeing | Dischargability |
|---|---|---|---|---|
| Reference | 100% | 100% | 100% | bad |
| Example 1 | 90% | 108% | 109% | excellent |
| Example 2 | 102% | 108% | 111% | excellent |
| Example 3 | 107% | 106% | 106% | excellent |
| Example 4 | 103% | 107% | 110% | excellent |
| Example 5 | 117% | 110% | 118% | excellent |

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A black reactive dye composition comprising:

(a) a black reactive dye of the formula (I);

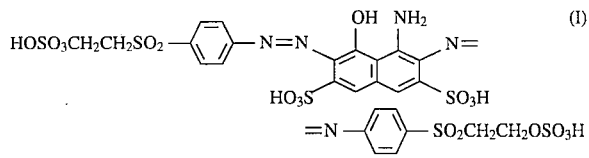

(b) a mono azo reactive dye of the formula (II)

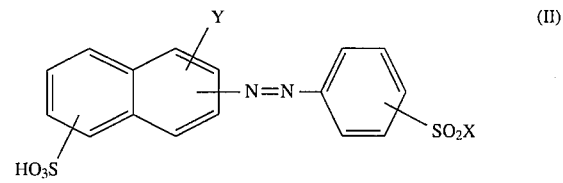

wherein X is —CH=CH$_2$ or CH$_2$CH$_2$W, W is —OSO$_3$H, Y is hydrogen, hydroxyl, or amino; and (c) at least one mono azo reactive dye selected from the formula (III) and (IV)

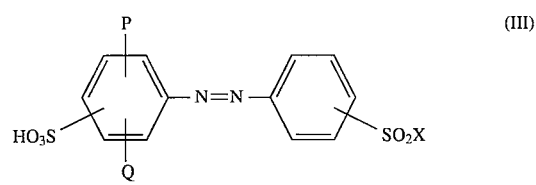

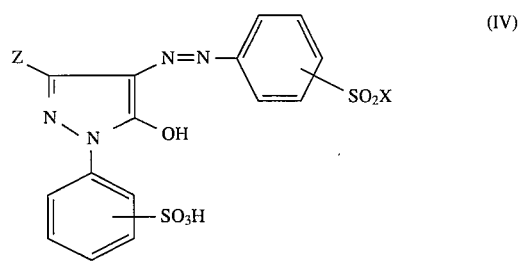

wherein X is —CH=CH$_2$ or —CH$_2$CH$_2$W, W is —OSO$_3$H, each of P and Q independently is hydrogen, methyl, ethyl, n-propyl, amino or acetamide, Z is methyl, ethyl, n-propyl or carboxyl, and SO$_2$X in each of Formulas (I), (II), and (III) is at para position.

2. The composition of claim 1, wherein component (c) is selected from said formula (III).

3. The composition of claim 1, wherein component (c) is selected from said formula (IV).

4. The composition of claim 2 comprising component (a) 50% to 94% by weight, component (b) 3% to 47% by weight, and component (c) 3% to 30% by weight.

5. The composition of claim 3 comprising component (a) 50% to 94% by weight, component (b) 3% to 47% by weight, and component (c) 3% to 30% by weight.

6. The composition of claim 1, wherein X is —$CH_2CH_2OSO_3H$, Y is hydroxyl or amino.

7. The composition of claim 1, wherein P is amino, Q is hydrogen, methyl, amino or acetamide.

8. The composition of claim 1, wherein Z is methyl or carboxyl.

\* \* \* \* \*